United States Patent
Ranjan

(10) Patent No.: US 11,731,780 B2
(45) Date of Patent: Aug. 22, 2023

(54) AIRCRAFT SYSTEM INCLUDING A CRYOGENIC FLUID OPERATED AUXILIARY POWER UNIT (APU)

(71) Applicant: Hamilton Sundstrand Corporation, Charlotte, NC (US)

(72) Inventor: Ram Ranjan, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/470,200

(22) Filed: Sep. 9, 2021

(65) Prior Publication Data

US 2023/0075009 A1    Mar. 9, 2023

(51) Int. Cl.
*F02C 6/08* (2006.01)
*F02C 7/141* (2006.01)
(Continued)

(52) U.S. Cl.
CPC ............ *B64D 41/00* (2013.01); *B64D 13/06* (2013.01); *F02C 6/08* (2013.01); *F02C 7/141* (2013.01);
(Continued)

(58) Field of Classification Search
CPC . B64D 41/00; B64D 13/06; F02C 6/08; F02C 7/141; F02C 7/32; F02C 7/224; F02C 7/36; F02C 7/12; F02C 3/30; F01D 25/32; F02K 25/06; F01K 23/106; F05D 2220/323; F05D 2260/207; F05D 2260/213; F05D 2260/232; F05D 2260/606

See application file for complete search history.

(56) References Cited

U.S. PATENT DOCUMENTS 5,657,951 A    8/1997  Giamati
7,380,749 B2   6/2008  Fucke et al.
(Continued)

FOREIGN PATENT DOCUMENTS

CN    105620760 A    6/2016
EP      3334240 A1   6/2018
(Continued)

OTHER PUBLICATIONS

European Application No. 22190576.3 filed Aug. 16, 2022; Extended European Search Report dated Feb. 6, 2023; 9 pages.
(Continued)

*Primary Examiner* — Todd E Manahan
*Assistant Examiner* — Rodolphe Andre Chabreyrie
(74) *Attorney, Agent, or Firm* — Cantor Colburn LLP

(57) ABSTRACT

An aircraft system includes a turbine engine having a compressor, a combustor having an inlet and an outlet, and a turbine having an inlet portion and an outlet portion. An auxiliary power unit (APU) is operatively connected to the turbine engine. The APU includes a compressor portion, a generator, and a turbine portion. The compressor portion is operatively connected to the turbine portion through the generator. A source of cryogenic fluid is operatively connected to the turbine engine and the APU. A heat exchange member includes an inlet section operatively connected to the source of cryogenic fluid, a first outlet section operatively connected to the turbine engine and a second outlet section operatively connected to the compressor portion.

14 Claims, 3 Drawing Sheets

(51) Int. Cl.
    *B64D 41/00*     (2006.01)
    *B64D 13/06*     (2006.01)
    *F02C 7/224*     (2006.01)
    *F02C 7/32*     (2006.01)

(52) U.S. Cl.
    CPC ............... *F02C 7/224* (2013.01); *F02C 7/32* (2013.01); *B64D 2013/0611* (2013.01)

(56) References Cited

U.S. PATENT DOCUMENTS

| | | |
|---|---|---|
| 8,468,847 B2 | 6/2013 | Klewer |
| 8,623,566 B2 | 1/2014 | Westenberger et al. |
| 9,669,936 B1 | 6/2017 | Fiterman et al. |
| 10,134,502 B2 | 11/2018 | Elverud |
| 10,224,556 B2 | 3/2019 | Lents et al. |
| 10,264,627 B2 | 4/2019 | Hartzler et al. |
| 10,293,945 B2 | 5/2019 | Hoffjann et al. |
| 10,785,831 B2 | 9/2020 | Slane et al. |
| 11,044,789 B2 | 6/2021 | Hu et al. |
| 2011/0194846 A1 | 8/2011 | Wang et al. |
| 2012/0240599 A1 | 9/2012 | Stolte |
| 2013/0316172 A1 | 11/2013 | Shanov et al. |
| 2016/0025339 A1 | 1/2016 | Kamath et al. |
| 2017/0144133 A1 | 5/2017 | Kim |
| 2018/0187595 A1* | 7/2018 | Apte ................. F02C 9/24 |
| 2019/0225343 A1 | 7/2019 | Bruno et al. |
| 2020/0088098 A1* | 3/2020 | Roberge ................ F02C 7/16 |
| 2020/0238576 A1 | 7/2020 | Christy et al. |
| 2021/0127458 A1 | 4/2021 | Jacob et al. |
| 2021/0185767 A1 | 6/2021 | Hu et al. |
| 2021/0300575 A1* | 9/2021 | Staubach ............... B64D 13/08 |
| 2021/0301720 A1* | 9/2021 | Staubach ................ F02C 7/141 |
| 2021/0348561 A1* | 11/2021 | Cocks ...................... F02C 3/22 |
| 2022/0299205 A1* | 9/2022 | MacDonald ............ F02C 3/205 |
| 2022/0356848 A1* | 11/2022 | Joshi ....................... F02C 7/224 |
| 2023/0077788 A1 | 3/2023 | Ching et al. |
| 2023/0080053 A1 | 3/2023 | Emerson et al. |

FOREIGN PATENT DOCUMENTS

| | | |
|---|---|---|
| EP | 3473595 A1 | 4/2019 |
| EP | 3885550 A1 | 9/2021 |
| GB | 2445458 A | 7/2008 |
| GB | 2587556 A | 3/2021 |
| WO | 2012173651 A1 | 12/2012 |
| WO | 2014105334 A1 | 7/2014 |
| WO | 2016144683 A1 | 9/2016 |
| WO | 2021007797 A1 | 1/2021 |
| WO | 2021240114 A2 | 12/2021 |

OTHER PUBLICATIONS

European Application No. 22190611.8 filed Aug. 16, 2022; Extended European Search Report dated Jan. 26, 2023; 9 pages.
European Application No. 22194675.9 filed Sep. 8, 2022; Extended European Search Report dated Jan. 30, 2023; 7 pages.
European Application No. 22201195.9 filed Oct. 12, 2022; Extended European Search Report dated Feb. 16, 2023; 13 pages.

* cited by examiner

AIRCRAFT SYSTEM INCLUDING A CRYOGENIC FLUID OPERATED AUXILIARY POWER UNIT (APU)

BACKGROUND

Exemplary embodiments pertain to the art of aircraft and, more particularly, to aircraft systems that employs a cryogenic fluid operated auxiliary power unit (APU).

Aircraft include various systems that provide power on when on the ground and environmental control systems (ECS) that are operated to condition and pressurize cabin air. Auxiliary power units (APU) and power push units (PPU) provide system power when aircraft engines are not in operation such as when sitting at a gate, sitting on a tarmac or the like. APUs may provide power to aircraft systems while PPUs may provide power to aircraft drive systems that allow the aircraft to move away from the gate before initiating main engines. APUs and PPUs include power systems that benefit from cooling.

Environmental control systems include a RAM air system that introduces ambient air into an ECS. In the ECS, the ambient air is pressurized and then cooled before being introduced into passenger spaces. In addition to cooling cabin air, other systems are employed to capture water or condensation from the cooling system for use in still other aircraft systems. The APU/PPU and the environmental control systems includes separate air supply systems.

BRIEF DESCRIPTION

Disclosed is an aircraft system including a turbine engine having a compressor, a combustor having an inlet and an outlet, and a turbine having an inlet portion and an outlet portion. An auxiliary power unit (APU) is operatively connected to the turbine engine. The APU includes a compressor portion, a generator, and a turbine portion. The compressor portion is operatively connected to the turbine portion through the generator. A source of cryogenic fluid is operatively connected to the turbine engine and the APU. A heat exchange member includes an inlet section operatively connected to the source of cryogenic fluid, a first outlet section operatively connected to the turbine engine and a second outlet section operatively connected to the compressor portion.

Additionally, or alternatively, in this or other non-limiting examples, the compressor portion includes an inlet member and an outlet member, and the turbine portion includes an inlet element and an outlet element, the inlet member being operatively connected to the heat exchange member and the inlet element being operatively connected to the outlet portion of the turbine.

Additionally, or alternatively, in this or other non-limiting examples, a heat exchanger system operatively coupled between the outlet portion of the turbine and the inlet element of the turbine portion in the APU.

Additionally, or alternatively, in this or other non-limiting examples, a pump operatively connected between the source of cryogenic fluid and heat exchange member.

Additionally, or alternatively, in this or other non-limiting examples, an intercooler heat exchanger operatively connected between the compressor and the combustor, the heat exchange member being operatively connected to the intercooler heat exchanger.

Additionally, or alternatively, in this or other non-limiting examples, a recuperator operatively connected between the outlet element of the turbine portion and the heat exchange member.

Additionally, or alternatively, in this or other non-limiting examples, an environmental control system (ECS) operatively connected to the compressor portion.

Additionally, or alternatively, in this or other non-limiting examples, the ECS includes an expander and a cabin heat exchanger, wherein the expander is operatively connected to the compressor portion of the APU.

Additionally, or alternatively, in this or other non-limiting examples, a heat exchange member operatively connected between the expander and the compressor portion.

Additionally, or alternatively, in this or other non-limiting examples, a cryogenic fluid preheater operatively connected between the combustor and the turbine, the cryogenic fluid preheater being further operatively connected to the heat exchange member.

Additionally, or alternatively, in this or other non-limiting examples, a fuel cell operatively connected between the compressor and the combustor, the fuel cell being further operatively connected to the cryogenic fluid preheater.

Also disclosed is an aircraft including a fuselage having a first wing, a second wing, and a tail. A turbine engine is supported by the fuselage. The turbine engine includes a compressor, a combustor having an inlet and an outlet, and a turbine having an inlet portion and an outlet portion. An auxiliary power unit (APU) is operatively connected to the turbine engine. The APU includes a compressor portion, a generator, and a turbine portion, the compressor portion being operatively connected to the turbine portion through the generator. A source of cryogenic fluid is operatively connected to the turbine engine and the APU. A heat exchange member includes an inlet section operatively connected to the source of cryogenic fluid, a first outlet section operatively connected to the turbine engine and a second outlet section operatively connected to the compressor portion.

Additionally, or alternatively, in this or other non-limiting examples, the compressor portion includes an inlet member and an outlet member, and the turbine portion includes an inlet element and an outlet element, the inlet member being operatively connected to the heat exchange member and the inlet element being operatively connected to the outlet portion of the turbine.

Additionally, or alternatively, in this or other non-limiting examples, a heat exchanger system operatively coupled between the outlet portion of the turbine and the inlet element of the turbine portion in the APU.

Additionally, or alternatively, in this or other non-limiting examples, an intercooler heat exchanger operatively connected between the compressor and the combustor, the heat exchange member being operatively connected to the intercooler heat exchanger.

Additionally, or alternatively, in this or other non-limiting examples, a recuperator operatively connected between the outlet element of the turbine portion and the heat exchange member.

Additionally, or alternatively, in this or other non-limiting examples, an environmental control system (ECS) operatively connected to the compressor portion.

Additionally, or alternatively, in this or other non-limiting examples, the ECS includes an expander and a cabin heat exchanger, wherein the expander is operatively connected to the compressor portion of the APU.

Additionally, or alternatively, in this or other non-limiting examples, a heat exchange member operatively connected between the expander and the compressor portion.

Additionally, or alternatively, in this or other non-limiting examples, a cryogenic fluid preheater is operatively connected between the combustor and the turbine. The cryogenic fluid preheater is further operatively connected to the heat exchange member. A fuel cell is operatively connected between the compressor and the combustor, the fuel cell being further operatively connected to the cryogenic fluid preheater.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
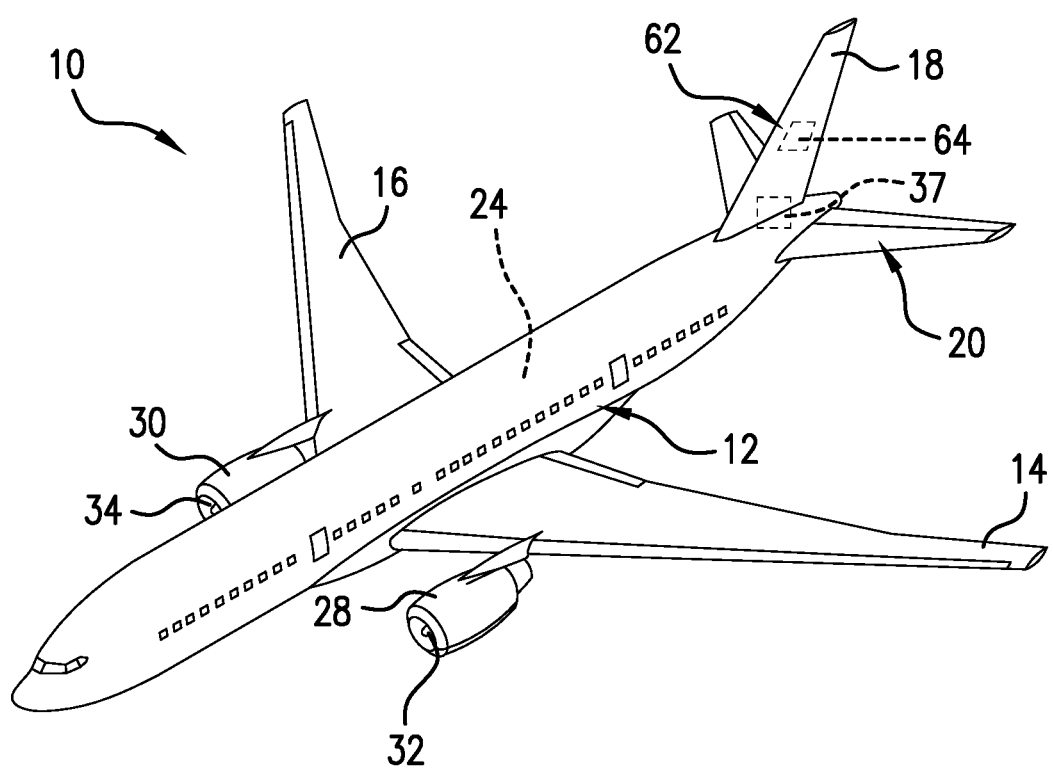
FIG. 1 depicts an aircraft including a cryogenic fluid powered auxiliary power unit (APU)

An aircraft, in accordance with a non-limiting example, is indicated generally at 10 in FIG. 1. Aircraft 10 includes a fuselage 12 supporting a first wing 14, a second wing 16 and a tail 18. In the non-limiting example shown, tail 18 supports a stabilizer 20. However, it should be understood that stabilizer 20 may also be directly supported by fuselage 12. Aircraft 10 includes a cabin 24 defined within fuselage 12. Cabin 24 provides space for passengers, crew, cargo, and the like.

First wing 14 supports a first engine nacelle 28 and second wing 16 supports a second engine nacelle 30. First engine nacelle 28 surrounds a first turbine engine 32 and second engine nacelle supports a second turbine engine 34. Tail 18 may also support an auxiliary power unit (APU) 37 that provides power to aircraft 10 while on the ground and first turbine engine 32 and second turbine engine 34 are not in operation. APU 37 may be combined with a power push unit (PPU) that provides power to motivate aircraft 10 while on the ground and first turbine engine 32 and second turbine engine 34 are not in operation.

Figure 2:
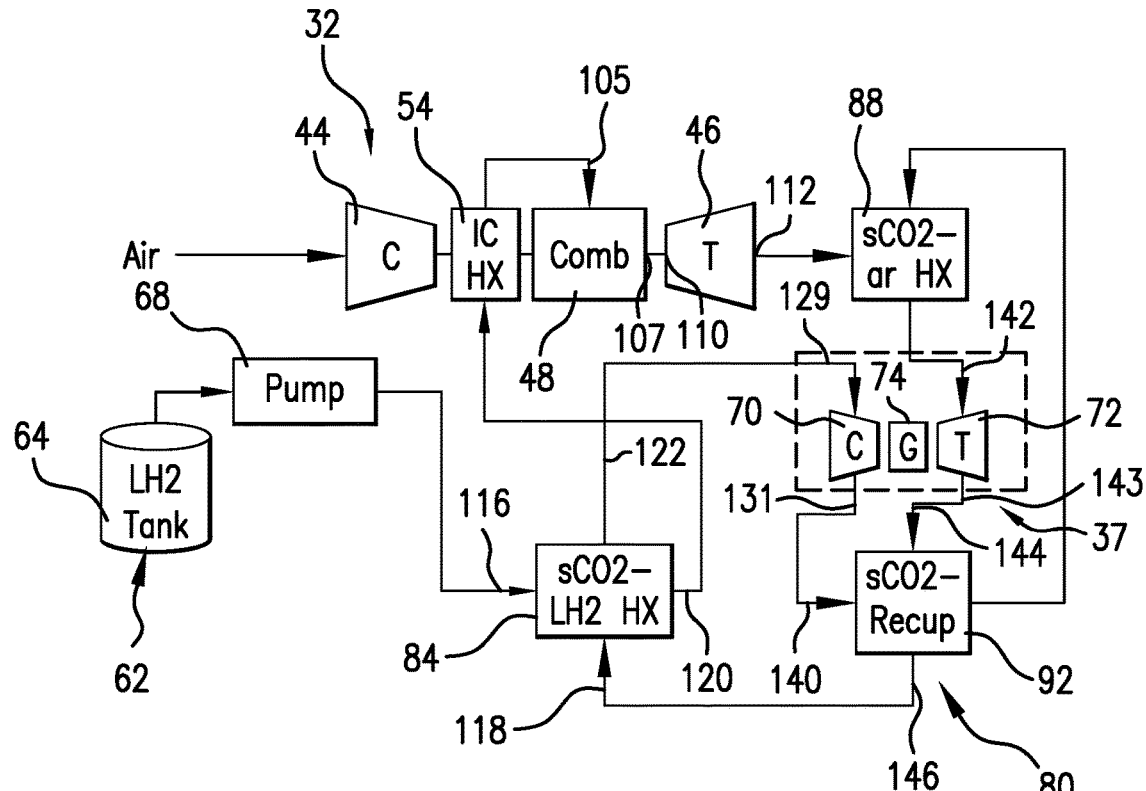
FIG. 2 is a block diagram illustrating a cryogenic fluid powered APU in accordance with a non-limiting example.

Reference will now follow to FIG. 2 in describing first turbine engine 32 with an understanding that second turbine engine 34 includes similar structure. First turbine engine 32 includes a compressor 44 operatively connected to a turbine 46 through a shaft (not shown). A combustor 48 fluidically and operatively connects compressor 44 and turbine 46. An intercooler heat exchanger 54 is disposed upstream of combustor 48. Intercooler heat exchanger 54 removes waste heat from a gas stream passing from compressor 44. The gas stream may pass from various points along a gas path (not shown) of compressor 44. That is, there may exist compressor stages after the fluid passing to Intercooler heat exchanger 54 in order to achieve higher overall air pressure ratio in an open-loop Brayton cycle defined, in part, by compressor 44, combustor 48, and intercooler heat exchanger 54.

In a non-limiting example, aircraft 10 includes a source of cryogenic fluid 62. Source of cryogenic fluid 62 may be defined by a tank 64 disposed in tail 18. It should be noted that the location of tank 64 may vary. A pump 68 is fluidically connected to source of cryogenic fluid 62. Pump 68 distributes cryogenic fluid to various systems in aircraft 10 as will be detailed herein. The cryogenic fluid is used as a heat exchange medium that replaces freon and other heat exchange mediums as will be detailed herein. In a non-limiting example, the cryogenic fluid in tank 64 may take the form of liquid hydrogen. Other cryogenic fluids, such as liquid nitrogen or other liquids having a boiling point at atmospheric pressure of about 120° K.

In a non-limiting example, APU 37 includes a compressor portion 70 coupled to a turbine portion 72 through a generator 74 which provides auxiliary power to aircraft 10. Aircraft 10 is also shown to include a bottoming cycle system 80 coupled to APU 37. Bottoming cycle system 80 includes a heat exchange member 84, a heat exchanger system 88, and a recuperator 92.

In a non-limiting example, combustor 48 includes an inlet 105 operatively connected to intercooler heat exchanger 54 and an outlet 107 coupled to turbine 46. Turbine 46 includes an inlet portion 110 coupled to outlet 107 of combustor 48 and an outlet portion 112 coupled to heat exchanger system 88 of bottoming cycle system 80. Heat exchange member 84 includes a first inlet section 116, a second inlet section 118, a first outlet section 120 and a second outlet section 122. First inlet section 116 is fluidically connected to pump 68 and second inlet section 118 is fluidically connected to recuperator 92. First outlet section 120 is operatively connected to intercooler heat exchanger 54 and second outlet section 122 is fluidically connected to compressor portion 70 of APU 37. In this manner, intercooler heat exchanger 54 heats up the cryogenic fluid to a combustible temperature of at least 273 K before entering combustor 48.

With this arrangement, cryogenic fluid from tank 64 is passed into heat exchange member 84 via first inlet section 116. The cryogenic fluid exchanges heat with fluid passing from recuperator 92 entering second inlet section 118. The cryogenic fluid then flows to intercooler 54 to exchange heat with fluid passing from compressor 44. The fluid, in the form of exhaust entering into heat exchange member 84, gives up heat to the cryogenic fluid and passes from heat exchange member 84 through second outlet section 122 and flows to an inlet member 129 of compressor portion 70.

The exhaust leaves compressor portion 70 via an outlet member 131 and passes into a first inlet 140 of recuperator 92. The exhaust may pass from a first outlet 142 of recuperator 92 and flow into heat exchanger system 88 where it exchanges heat with exhaust from turbine 46. The now cooler exhaust flows into an inlet element 142 into turbine portion 72 and from an outlet element 143 back to recuperator 92 via a second inlet 144. The exhaust gives up heat and passes from a second outlet 146 of recuperator 92 to heat exchange member 84. Thus, the cryogenic fluid is employed as a heat exchange medium to control flow temperatures in turbine engine 32 as well as APU 37.

Figure 3:
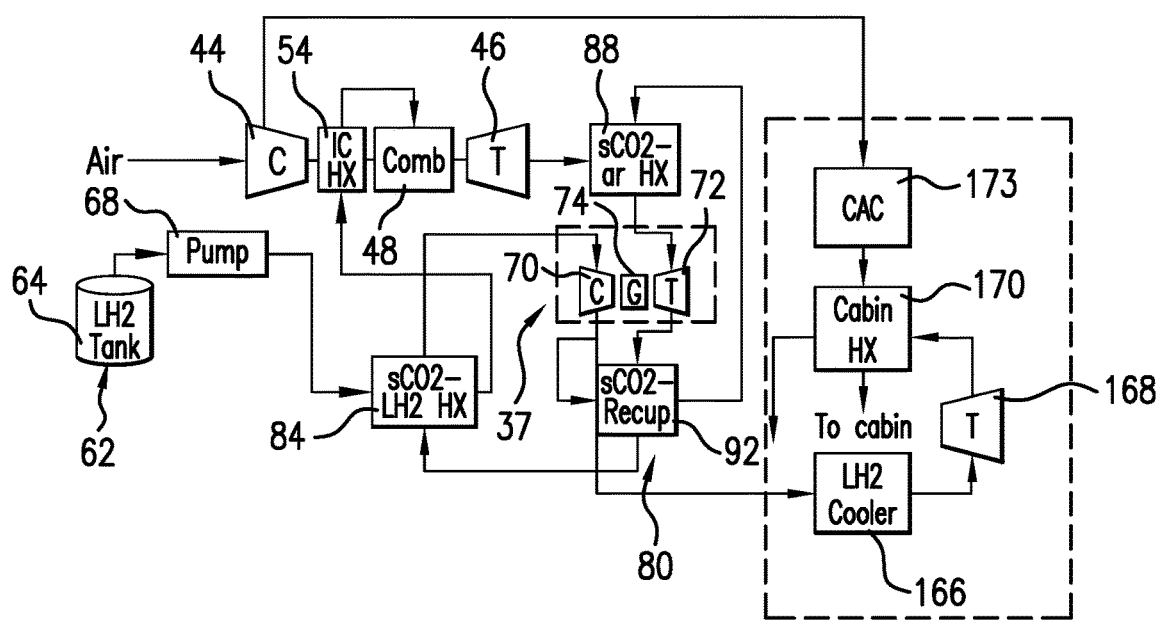
FIG. 3 depicts a cryogenic fluid powered APU in accordance with another non-limiting example.

Reference will now follow to FIG. 3, wherein like reference numbers represent corresponding parts in the respective views in describing the addition of an environmental control system (ECS) 162 to bottoming cycle system 80. ECS 162 includes a cryogenic fluid cooler 166 that exchanges heat between the cryogenic fluid and fluid passing from outlet member 131 of compressor portion 70. The now cooler fluid passes to an expander 168 that may take the form of a RAM air turbine or a throttle valve that expands and pressurized supercritical CO2 which will expand into cold CO2 liquid before flowing to a cabin heat exchanger 170. Cabin heat exchanger removes heat from fluids passing from a cabin air compressor 173. With this arrangement, not only is the cryogenic fluid used as a heat exchange medium for first turbine engine 32 and APU 37 but also operates to condition air passing into cabin 24. Further, bleed air from compressor 44 may be passed to ECS 162 to be used alone, or in combination with cabin air cooler 173 to condition air passing into cabin 2

Figure 4:
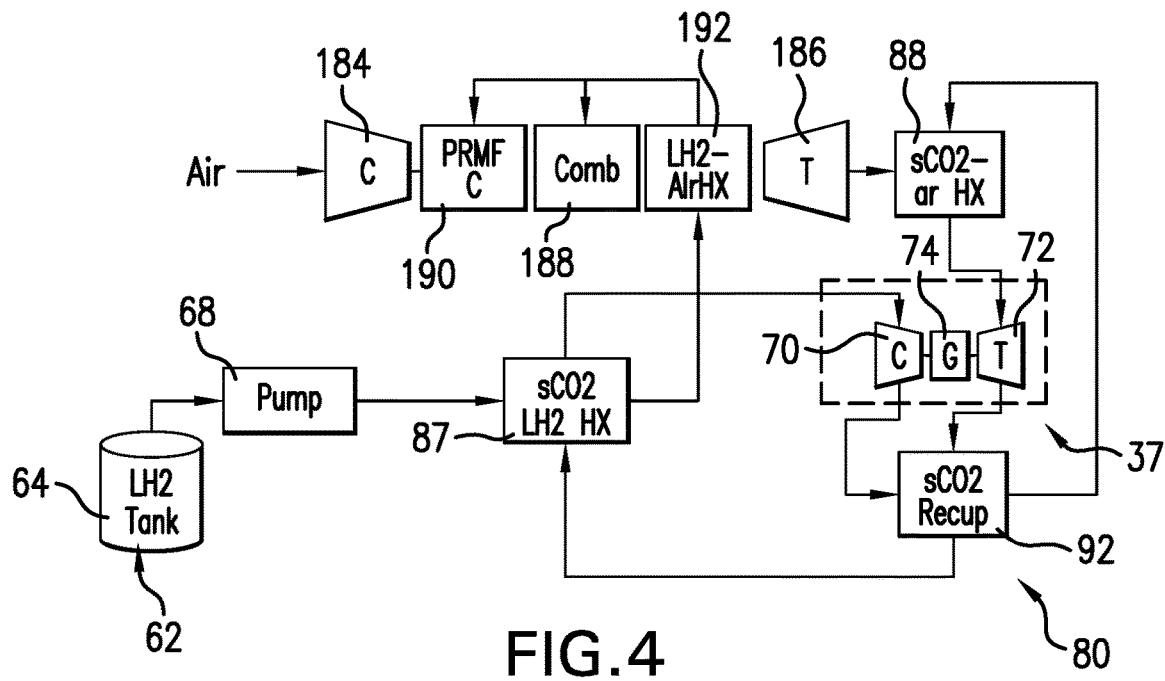
FIG. 4 depicts a cryogenic fluid powered APU in accordance with yet another non-limiting example.

Reference will now follow to FIG. 4, where like reference numbers represent corresponding parts in the respective views in describing another non-limiting example. In FIG. 4 a turbine engine 182 includes a compressor 184 operatively connected to a turbine 186 via a shaft (not shown). A combustor 188 fluidically and operatively connects compressor 184 and turbine 186. A fuel cell 190, which may take the form of a polymer electrolyte membrane that operates on cryogenic fluid is operatively connected to compressor 184. Fuel cell 190 may be arranged to provide power to various aircraft components such as RAM air turbine 168. A cryogenic fluid preheater 192 coupled to heat exchange member 87 may be employed to pre-heat the cryogenic fluid passing to combustor 188 and fuel cell 190.

Figure 5:
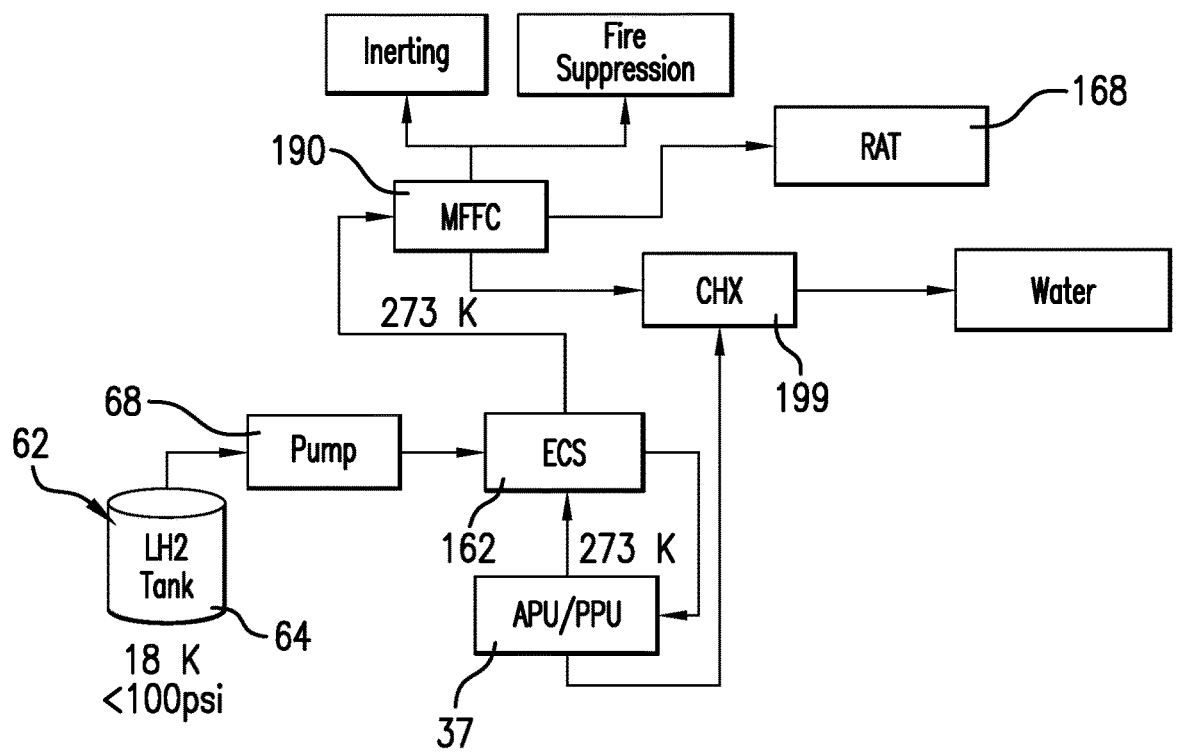
FIG. 5 depicts a cryogenic fluid powered APU, in accordance with still yet another non-limiting example.

At this point, it should be understood that the non-limiting examples describe systems that create synergies between power generation, ECS cooling, and other systems on the aircraft. For example, as shown in FIG. 5 cryogenic fluid passing from fuel cell 190 may be used as an inert gas or fire suppression medium on the aircraft. Gases flowing from ECS 162 through fuel cell 190 may also pass through a condensing heat exchanger 199 to extract water that may be employed on board the aircraft. The use of cryogenic fluid in fuel cells and both auxiliary and secondary power systems can eliminate the need for separate power supplies and heat exchangers as well as heat exchange mediums in order to reduce component weight, simplify onboard systems, and provide backup power to various components.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft system comprising:
   a turbine engine including a compressor, a combustor having an inlet and an outlet, and a turbine having an inlet portion and an outlet portion;
   an auxiliary power unit (APU) operatively connected to the turbine engine, the APU including a compressor portion, a generator, and a turbine portion, the compressor portion being operatively connected to the turbine portion through the generator, the compressor portion including a cryogenic fluid inlet and a cryogenic fluid outlet;
   a source of cryogenic fluid operatively connected to the turbine engine and the APU;
   a heat exchange member including an inlet section operatively connected to the source of cryogenic fluid, a first outlet section operatively connected to the turbine engine and a second outlet section operatively connected to the compressor portion at the cryogenic fluid inlet; and
   an environmental control system (ECS) connected to the APU, the ECS including a cryogenic fluid cooler, an expander fluidically connected to the cryogenic fluid cooler, and a cabin air heat exchanger connected to the expander, the cryogenic fluid cooler being fluidically connected to cryogenic fluid outlet.

2. The aircraft system according to claim 1, wherein the turbine portion includes an inlet element, and an outlet element, the inlet element being operatively connected to the outlet portion of the turbine.

3. The aircraft system according to claim 2, further comprising: a heat exchanger system operatively coupled between the outlet portion of the turbine and the inlet element of the turbine portion in the APU.

4. The aircraft system according to claim 3, further comprising: a pump operatively connected between the source of cryogenic fluid and the heat exchange member.

5. The aircraft system according to claim 3, further comprising: an intercooler heat exchanger operatively connected between the compressor and the combustor, the heat exchange member being operatively connected to the intercooler heat exchanger.

6. The aircraft system according to claim 2, further comprising: a recuperator operatively connected between the outlet element of the turbine portion and the heat exchange member, the recuperator being fluidically connected between the compressor portion and the cryogenic fluid cooler.

7. The aircraft system according to claim 6, further comprising: a cryogenic fluid preheater operatively connected between the combustor and the turbine, the cryogenic fluid preheater being further operatively connected to the heat exchange member.

8. The aircraft system according to claim 7, further comprising: a fuel cell operatively connected between the compressor and the combustor, the fuel cell being further operatively connected to the cryogenic fluid preheater.

9. An aircraft comprising:
a fuselage including a first wing, a second wing, and a tail;
a turbine engine supported by the fuselage, the turbine engine including a compressor, a combustor having an inlet and an outlet, and a turbine having an inlet portion and an outlet portion;
an auxiliary power unit (APU) operatively connected to the turbine engine, the APU including a compressor portion, a generator, and a turbine portion, the compressor portion being operatively connected to the turbine portion through the generator, the compressor portion including a cryogenic fluid inlet and a cryogenic fluid outlet;
a source of cryogenic fluid operatively connected to the turbine engine and the APU; and
a heat exchange member including an inlet section operatively connected to the source of cryogenic fluid, a first outlet section operatively connected to the turbine engine and a second outlet section operatively connected to the compressor portion at the cryogenic fluid inlet; and
an environmental control system (ECS) connected to the APU, the ECS including a cryogenic fluid cooler, an expander fluidically connected to the cryogenic fluid cooler, and a cabin air heat exchanger connected to the expander, the cryogenic fluid cooler being fluidically connected to cryogenic fluid outlet.

10. The aircraft according to claim 9, wherein the turbine portion includes an inlet element, and an outlet element, the inlet element being operatively connected to the outlet portion of the turbine.

11. The aircraft according to claim 10, further comprising: a heat exchanger system operatively coupled between the outlet portion of the turbine and the inlet element of the turbine portion in the APU.

12. The aircraft according to claim 11, further comprising: an intercooler heat exchanger operatively connected between the compressor and the combustor, the heat exchange member being operatively connected to the intercooler heat exchanger.

13. The aircraft according to claim 10, further comprising: further comprising: a recuperator operatively connected between the outlet element of the turbine portion and the heat exchange member, the recuperator being fluidically connected between the compressor portion and the cryogenic fluid cooler.

14. The aircraft according to claim 13, further comprising:
a cryogenic fluid preheater operatively connected between the combustor and the turbine, the cryogenic fluid preheater being further operatively connected to the heat exchange member; and
a fuel cell operatively connected between the compressor and the combustor, the fuel cell being further operatively connected to the cryogenic fluid preheater.

* * * * *